US008133357B2

(12) United States Patent
Cao et al.

(10) Patent No.: US 8,133,357 B2
(45) Date of Patent: *Mar. 13, 2012

(54) PANELS INCLUDING RENEWABLE COMPONENTS AND METHODS FOR MANUFACTURING SAME

(75) Inventors: Bangji Cao, Naperville, IL (US); Te Hua Lau, Glenview, IL (US); W. David Song, Lake Forest, IL (US); Martin W. Brown, Gurnee, IL (US)

(73) Assignee: USG Interiors, Inc., Chicago, IL (US)

( * ) Notice: Subject to any disclaimer, the term of this patent is extended or adjusted under 35 U.S.C. 154(b) by 71 days.

This patent is subject to a terminal disclaimer.

(21) Appl. No.: 12/414,313

(22) Filed: Mar. 30, 2009

(65) Prior Publication Data

US 2009/0260918 A1 Oct. 22, 2009

Related U.S. Application Data

(63) Continuation-in-part of application No. 12/106,077, filed on Apr. 18, 2008, now Pat. No. 7,935,223.

(51) Int. Cl.
*D21F 11/00* (2006.01)
(52) U.S. Cl. ...................................................... 162/202
(58) Field of Classification Search .................. 162/141, 162/202; 442/71, 136, 140, 141; 264/112, 264/129; 181/290, 294; 427/384
See application file for complete search history.

(56) References Cited

U.S. PATENT DOCUMENTS

| 659,942 A | 10/1900 | Thatcher |
| 764,849 A | 7/1904 | Hubbard |
| 1,769,519 A | 7/1930 | King et al. |
| 1,960,372 A | 5/1934 | Davey |
| 1,968,489 A | 7/1934 | Jenkins |
| 1,983,022 A | 12/1934 | Eston et al. |
| 3,519,450 A | 7/1970 | Polis |
| 3,830,903 A | 8/1974 | Robinsky et al. |
| 4,366,096 A | 12/1982 | Abrams et al. |
| 4,746,688 A | 5/1988 | Bistak et al. |
| 5,071,511 A | 12/1991 | Pittman |
| 5,656,129 A | 8/1997 | Good et al. |
| 5,905,234 A | 5/1999 | Tsukamoto et al. |
| 6,443,257 B1 | 9/2002 | Wiker et al. |
| 6,443,258 B1 | 9/2002 | Putt et al. |
| 6,616,804 B2 | 9/2003 | Foster et al. |
| 6,780,356 B1 | 8/2004 | Putt et al. |
| 2002/0162298 A1 | 11/2002 | Churchill et al. |
| 2004/0048531 A1 | 3/2004 | Belmares et al. |
| 2006/0070321 A1 | 4/2006 | Au |
| 2006/0182940 A1 | 8/2006 | Cline |
| 2006/0252323 A1 | 11/2006 | Cline |
| 2007/0042658 A1 | 2/2007 | Cline et al. |
| 2008/0020961 A1 | 1/2008 | Rodrigues et al. |

FOREIGN PATENT DOCUMENTS

| EP | 49733 A1 | 8/1981 |
| EP | 0 808 953 | 11/1997 |
| JP | 54063514 | 5/1979 |
| JP | 58072441 | 4/1983 |

OTHER PUBLICATIONS

Indian Institute of Technology Project Proposal, "Development of Sound Proofing Composite Materials Using Jute Products", Sep. 2007, pp. 1-18; Sep. 2007. Armstrong, "See What's Growing", pp. 1-7, http://www.armstrong.com/common/c2002/content/files/51053.pdf.

*Primary Examiner* — Mark Halpern
(74) *Attorney, Agent, or Firm* — Greer, Burns & Crain, Ltd.; Pradip Sahu; Philip T. Petti

(57) ABSTRACT

A panel includes about 0.1% to about 95% by weight of a ground renewable component. In an embodiment, the panel has at least one core comprising: from about 0.1% to about 95% by weight of the ground renewable component; from about 0.1% to about 95% by weight of one or more fibers; and from about 1% to about 30% by weight of one or more binders, all based on dry panel weight. In an embodiment, the ground renewable component has a particle size distribution whereby less than 5% of the particles are retained by a mesh screen with openings of about 0.312 inches and less than 5% of the particles pass through a mesh screen with openings of about 0.059 inches. A method for manufacturing such panels is also provided.

18 Claims, No Drawings

PANELS INCLUDING RENEWABLE COMPONENTS AND METHODS FOR MANUFACTURING SAME

CROSS REFERENCE TO RELATED APPLICATION

This application claims the benefit under 35 U.S.C. §120 as a continuation-in-part application of U.S. Ser. No. 12/106,077, filed Apr. 18, 2008 now U.S. Pat. No. 7,935,223 and herein incorporated by reference.

FIELD OF THE INVENTION

The present invention relates to panels for the building industry that include a ground renewable component to improve acoustic and physical properties of the panel. Methods of making such panels are also provided.

BACKGROUND

Panels used as building panels for tiles or walls provide architectural value, acoustical absorbency, acoustical attenuation and utility functions to building interiors. Commonly, panels, such as acoustical panels, are used in areas that require noise control. Examples of these areas are office buildings, department stores, hospitals, hotels, auditoriums, airports, restaurants, libraries, classrooms, theaters, and cinemas, as well as residential buildings.

To provide architectural value and utility functions, an acoustical panel, for example, is substantially flat and self-supporting for suspension in a typical ceiling grid system or similar structure. Thus, acoustical panels possess a certain level of hardness and rigidity, which is often measured by its modulus of rupture ("MOR"). To obtain desired acoustical characteristics, an acoustical panel also possesses sound absorption and transmission reduction properties.

Sound absorption is typically measured by its Noise Reduction Coefficient ("NRC") as described in ASTM C423. NRC is represented by a number between 0 and 1.00, which indicates the fraction of sound reaching the panel that is absorbed. An acoustical panel with an NRC value of 0.60 absorbs 60% of the sound that strikes it and deflects 40% of the sound. Another test method is estimated NRC ("eNRC"), which uses an impedance tube as described in ASTM C384.

The ability to reduce sound transmission is measured by the values of Ceiling Attenuation Class ("CAC") as described in ASTM E1414. CAC value is measured in decibels ("dB"), and represents the amount of sound reduction when sound is transmitted through the material. For example, an acoustical panel with a CAC of 40 reduces transmitted sound by 40 decibels. Similarly, sound transmission reduction can also be measured by its Sound Transmission Class ("STC") as described in ASTM E413 and E90. For example, a panel with an STC value of 40 reduces transmitted sound by 40 decibels.

Acoustical panels made in accordance with various industry standards and building codes have a Class A fire rating. According to ASTM E84, a flame spread index less than 25 and a smoke development index less than 50 are required. Airflow resistivity, a measurement of the porosity of a mat, is tested according to modified ASTM C423 and C386 standards. In addition, MOR, hardness and sag of acoustical panels are tested according to ASTM C367. Increased porosity of a base mat improves acoustical absorbency, but it is not measured by any specific industry standard or building code. All ASTM test methods referenced herein are hereby incorporated by reference.

Currently, most acoustical panels or tiles are made using a water-felting process preferred in the art due to its speed and efficiency. In a water-felting process, the base mat is formed utilizing a method similar to papermaking. One version of this process is described in U.S. Pat. No. 5,911,818 issued to Baig, herein incorporated by reference. Initially, an aqueous slurry including a dilute aqueous dispersion of mineral wool and a lightweight aggregate, is delivered onto a moving foraminous wire of a Fourdrinier-type mat forming machine. Water is drained by gravity from the slurry and then optionally further dewatered by means of vacuum suction and/or by pressing. Next, the dewatered base mat, which may still hold some water, is dried in a heated oven or kiln to remove the residual moisture. Panels of acceptable size, appearance and acoustic properties are obtained by finishing the dried base mat. Finishing includes surface grinding, cutting, perforation/fissuring, roll/spray coating, edge cutting and/or laminating the panel onto a scrim or screen.

A typical acoustical panel base mat composition includes inorganic fibers, cellulosic fibers, binders and fillers. As is known in the industry, inorganic fibers can be either mineral wool (which is interchangeable with slag wool, rock wool and stone wool) or fiberglass. Mineral wool is formed by first melting slag or rock wool at 1300° C. (2372° F.) to 1650° C. (3002° F.). The molten mineral is then spun into wool in a fiberizing spinner via a continuous air stream. Inorganic fibers are stiff, giving the base mat bulk and porosity. Conversely, cellulosic fibers act as structural elements, providing both wet and dry base mat strength. The strength is due to the formation of countless hydrogen bonds with various ingredients in the base mat, which is a result of the hydrophilic nature of the cellulosic fibers.

A typical base mat binder is starch. Typical starches used in acoustical panels are unmodified, uncooked starch granules that are dispersed in the aqueous panel slurry and distributed generally uniformly in the base mat. Once heated, the starch granules become cooked and dissolve, providing binding ability to the panel ingredients. Starches not only assist in the flexural strength of the acoustical panels, but also improve hardness and rigidity of the panel. In certain panel compositions having a high concentration of inorganic fibers, a latex binder is used as the primary binding agent.

Typical base mat fillers include both heavyweight and lightweight inorganic materials. A primary function of the filler is to provide flexural strength and contribute to the hardness of the panel. Even though the term "filler" is used throughout this disclosure, it is to be understood that each filler has unique properties and/or characteristics that can influence the rigidity, hardness, sag, sound absorption and reduction in the sound transmission in panels. Examples of heavyweight fillers include calcium carbonate, clay or gypsum. An example of a lightweight filler includes expanded perlite. As a filler, expanded perlite has the advantage of being bulky, thereby reducing the amount of filler required in the base mat. It is also contemplated that the term "filler" includes combinations or mixtures of fillers.

One disadvantage of expanded perlite is that the perlite particles tend to fill the pores in the base mat and seal its surface, which compromises the sound absorption capacity of the panel. Furthermore, expanded perlite is relatively fragile and frangible during the manufacturing process. In general, the greater the amount of expanded perlite used, the poorer the panel acoustic absorption properties. The expansion of perlite also consumes a significant amount of energy. Expanded perlite is formed when perlite ore is introduced into an expanding tower that is heated to about 950° C. (1750° F.). Water in the perlite structure turns to steam and the resulting expansion causes the perlite to "pop" like popcorn to reduce the density to about one-tenth of the unexpanded material. The lower bulk density of expanded perlite enables it to flow upward in the expanding tower and be collected by a filtering device. This process uses a relatively large amount of energy to heat all of the perlite to a temperature sufficient to vaporize the water within it.

Given the current trends in the building industry, there is a desire for products which are environmentally friendly, i.e., made with processes that result in reduced global warming, acidification, smog, eutrophication of water, solid waste, primary energy consumption and/or water effluent discharge. In general, naturally growing, renewable materials can be used to produce environmentally friendly building products. In the building industry, a widely used renewable material is lumber, but it provides little acoustical absorption. Similarly, there is a large amount of agricultural waste and byproducts, as well as lumber and furniture industry waste that is readily available but has limited use in building materials production.

In order to use naturally growing renewable materials, its fibers need to be extracted and the extraction mechanism can be made by pulping ligno-cellulosic materials such as wood, straw, bamboo and others to break the plant material into its individual fiber cells either chemically or mechanically. A common chemical pulping method uses sodium sulfide, sodium hydroxide or sodium sulfite to dissolve the lignin at about 150° C. (302° F.) to about 180° C. (356° F.), reducing the fiber's biomass by about 40-60%. Conversely, a thermal-mechanical pulping method subjects wood chips to high temperatures (about 130° C. (266° F.)) and high pressure (about 3-4 atmospheres (304-405 kPa)), causing the lignin to soften and allowing fiber cells to be mechanically torn apart. Disruption of the lignin bond causes the defiberization of the raw material with a resulting loss in its biomass of about 5-10%. Both chemical and thermal-mechanical pulping processes require significant amount of energy to reduce the ligno-cellulosic material to its individual fibers. Further, the loss of such a large fraction of the biomass increases the cost of raw materials.

Several United States patents teach using renewable materials in building materials. U.S. Pat. No. 6,322,731 discloses a method for forming a structural panel of indefinite length that includes an organic particulate base material consisting predominately of rice hulls and a binder. Due to the requirements for structural integrity, the process requires a combination of high temperature and high pressure to form a panel of sufficient strength. The resultant panel has relatively low sound absorption value due to its high density and low porosity. The thermal and acoustic insulation characteristics are achieved through the encased cavities.

U.S. Pat. No. 5,851,281 discloses a process for manufacturing a cement-waste material composite where the waste material is rice husks. The rice husks are heated to approximately 600° C. (1112° F.) in the absence of oxygen to produce micro-granules.

U.S. Pat. No. 6,443,258 discloses an acoustically absorbent porous panel formed from a cured, aqueous, foamed, cementitious material. The panel provides good acoustical performance with enhanced durability and moisture resistance. Rice hull ash is added to enhance the overall hardness of the foamed cement panel.

SUMMARY OF THE INVENTION

A panel is provided for use as a building material having improved acoustic and physical properties. The present panels include a ground renewable component, such as rice hulls, and have improved acoustic properties, including maintaining a relatively constant CAC or STC. In addition, an improved NRC is achieved while maintaining or improving other physical properties of the panel, including the MOR, hardness, air-flow resistivity and sag.

In one embodiment, the present panel includes a panel core including from about 0.1% to about 95% by weight of a ground renewable component; from about 0.1% to about 95% by weight of one or more fibers; from about 1% to about 30% by weight of one or more binders; and from about 3% to about 80% by weight of one or more fillers, all based on the dry panel weight. The ground renewable component has a particle size distribution whereby less than 5% of the particles are retained by a mesh screen with openings of about 0.312 inches and less than 5% of the particles pass through a mesh screen with openings of about 0.059 inches.

In another embodiment, a method for the production of a panel for use as a building material includes the steps of selecting a ground renewable component; combining water with from about 0.1% to about 95% by weight of the renewable component; from about 1% to about 50% by weight of a fiber; from about 1% to about 30% by weight of a binder; and from about 3% to about 80% by weight of a filler to form an aqueous slurry; forming a base mat on a foraminous wire from the aqueous slurry; removing water from the base mat and finishing the base mat. The renewable component is separated to obtain the particle size distribution described above. The panel made by this method has at least one of a CAC value of at least about 25 and an NRC value of at least about 0.25.

An advantage of using a ground renewable material is that it is prepared without significant loss in biomass. The ground or milled renewable material maintains its bulk structure and is not subjected to chemical modification or changes in chemical structure, such as defiberizing. Retention of the biomass results in more efficient use of the purchased raw materials, thereby reducing its cost.

Selection of a different filler to be used in a building panel often undesirably changes panel properties. However, use of the present renewable component reduces energy and raw material costs while maintaining or improving other physical properties of the panel.

DETAILED DESCRIPTION OF AN EMBODIMENT OF THE INVENTION

The product, method and composition described herein are intended to apply to panels for use as building materials. More specifically, the panels can also be used as ceiling panel products, acoustical panels or tiles. The following discussion is directed to an acoustical panel as one embodiment of the invention; however this is not intended to limit the invention in any way.

Fibers are present in the acoustical panel as inorganic fibers, organic fibers or combinations thereof. Inorganic fibers can be mineral wool, slag wool, rock wool, stone wool, fiberglass or mixtures thereof. The inorganic fibers are stiff, giving the base mat bulk and porosity. Inorganic fibers are present in the acoustical panel in amount of about 0.1% to about 95%, based on the weight of the panel. At least one embodiment of the acoustical panel uses mineral wool as the preferred fiber. Cellulosic fibers, an example of an organic fiber, act as structural elements providing both wet and dry base mat strength. The strength is due to the formation of hydrogen bonds with various ingredients in the base mat, which is a result of the hydrophilic nature of the cellulosic fibers. Cellulosic fibers in the base mat range from about 1% to about 50% by weight of the panel, preferably about 5% to about 40% and most preferably from about 10% to about 30%. One preferred cellulosic fiber is derived from recycled newsprint.

The panels include at least one ingredient that is a ground renewable component. For the purposes of this invention, ground renewable components are defined as wood or non-wood plants, or a portion of wood or non-wood plants which are reduced in particle size by mechanical means. These ground renewable components are preferably ligno-cellulosic, which include cellulose and lignin. Potential sources of these materials are waste materials or byproducts from the farming industry, the agricultural industry, the forestry industry and/or the building industry.

Examples of ground renewable components include, but are not limited to: rice hulls, buckwheat hulls, nut shells, including peanut and walnut shells, wheat chaff, oak husk, rye whisk, cotton seed hull, coconut shells, corn bran, corn cobs, rice straw stalk, wheat straw stalk, barley straw stalk, oat straw stalk, rye straw stalk, bagasse, reeds, Espart, Sabai, flax, kenaf, jute, hemp, ramie, abaca, sisal, saw dust, bamboos, wood chips, sorghum stalks, sunflower seeds, other similar materials and mixtures thereof.

The ground renewable components are reduced in size prior to mixing with other panel ingredients. The ground renewable materials have a particle size that passes through a mesh screen with 0.312 inch openings (2.5 mesh as defined by the ASTM sieve chart) and is retained on a mesh screen with 0.0059 inch openings (100 mesh as defined by the ASTM sieve chart). In some embodiments, the renewable component is used as received from a supplier. Use of the term "ground renewable component" is intended to include particles that are reduced in size by any mechanical method as is known in the art, including particles that are comminuted, shredded, ground, milled, sieved or combinations thereof. Size reduction is optionally achieved by mechanical processes, such as grinding or milling, to obtain the desired sizes. At least one embodiment uses hammer mill-type equipment.

Optionally, ground renewable components can be sieved with screens of particular mesh sizes to obtain a desired particle size distribution. The coarse fraction that is too large to pass through the largest desired screen is optionally removed and re-processed until the resulting material passes through the screen. In one embodiment, the ground rice hulls are first sieved with a #30 mesh screen to remove large particles, followed by sieving through a #80 mesh screen to remove particles that are too fine. The processed hulls that pass the #30 mesh screen and are retained on the #80 mesh screen are used to make the acoustical panels. In this embodiment, the materials that pass through the #80 mesh screen are not used in the panels. The #30 mesh screen has an opening of 0.022 inches or 0.55 mm. The #80 mesh screen has an opening of 0.007 inches or 180 µm. In another embodiment, the processed hulls obtained directly from a rice milling plant are used to make acoustical panels. The particle distribution of the comminuted renewable material preferably has at least about 95% of the particles that pass through a #30 mesh screen and no more than about 5% of the particles pass through a #80 mesh screen of a U.S. Sieve Set.

As discussed in the Background, expanded perlite is a material that is often used as one of the fillers in building panels. When used in ceiling panels, expanded perlite tends to form a structure that lacks inter-connected pores. Introducing a ground renewable component into acoustical panels helps to interrupt the expanded perlite structure and thereby increases interconnected pores. Panels including ground renewable components in addition to perlite are more porous and yield higher acoustical absorbency than panels having perlite without any ground renewable components.

It has been observed that the larger the particle size of the ground renewable component, the higher the acoustical absorption value. The optimum particle size distribution for any one embodiment depends on the desired acoustical absorption value.

It should be appreciated that the ground renewable component particle size distribution is desirably compatible with other ingredients, such as fiber, expanded perlite and the like, to form a homogeneous and uniform slurry. Formation of a uniform slurry leads to production of homogeneous and uniform base mat. The particle size distribution is preferably chosen so as to maintain or improve the physical integrity of the panel.

In some embodiments, the ground renewable components include less than about 5% by weight of particles that are retained by a #6 mesh screen. In other embodiments, the renewable components used include less than about 5% of particles that are retained by a #20 mesh screen. In still other embodiments, the ground or milled renewable components used include less than about 5% of particles that are retained by a #30 mesh screen. Preferably, the ground renewable components have a bulk density between about 5 to about 50 lbs/ft$^3$ (80 to 800 kg/m$^3$), with a more preferred bulk density of about 10 to 40 lbs/ft$^3$ (160 to 640 kg/m$^3$) and a most preferred range of about 20 to about 35 lbs/ft$^3$ (320 to 560 kg/M$^3$). The #6 mesh screen has an opening of 0.132 inches or 3.35 mm, the #20 screen mesh has an opening of 0.0312 inches or 800 µm and the #30 screen mesh has an opening of 0.022 inches or 0.55 mm.

Starch is optionally included in the base mat as the binder. Typical starches are unmodified, uncooked starch granules that are dispersed in the aqueous slurry and become distributed generally uniformly through the base mat. The base mat is heated, cooking and dissolving the starch granules to bind the panel ingredients together. Starch not only assists in the flexural strength of the acoustical panels, but also improves the hardness and rigidity of the panel. In addition, the base mat optionally includes starches in the range of about 1% to about 30% by weight based on the dry weight of the panel, more preferably from about 3% to about 15% and most preferably from about 5% to about 10%.

Typical base mat fillers include both lightweight and heavyweight inorganic materials. Examples of heavyweight fillers include calcium carbonate, clay or gypsum. Other fillers are also contemplated for use in the acoustical panels. In one embodiment, calcium carbonate in the range from about 0.5% to about 10% by weight of the panel is utilized. The calcium carbonate can also be used in the range of about 3% to about 8% by weight of the panel.

An example of the lightweight filler is expanded perlite. Expanded perlite is bulky, reducing the amount of filler used in the base mat. Primary functions of the filler are improved flexural strength and hardness of the panel. Even though the term "filler" is used throughout this discussion, it is to be understood that each filler has unique properties and/or characteristics that can influence the rigidity, hardness, sag, sound absorption and reduction in the sound transmission in panels. The expanded perlite in the base mat of this embodiment is present in amount ranging from about 5% to about 80% by weight of the panel, more preferably about 10% to about 60% by weight of the panel and most preferably from about 20% to about 40% by weight of the panel.

In one preferred embodiment, the base mat includes a ground renewable component, mineral wool, expanded perlite, starch, calcium carbonate and/or clay. One of the preferred ground renewable components is rice hulls. The percentage of ground renewable component is in the range of about 0.1% to about 95% by weight of the panel, more preferably about 5% to about 60% and most preferably from about 7% to about 40%.

Another optional ingredient in the acoustical panel is clay, which is typically included to improve fire resistance. When exposed to fire, the clay does not burn; instead, it sinters. Acoustical panels optionally include from about 0% to about 10% clay by weight of the panel, with a preferred range of about 1% to about 5%. Many types of clay are used including but not limited to Spinks Clay and Ball Clay from Gleason, Tenn. and Old Hickory Clay from Hickory, Ky.

A flocculant is also optionally added to the acoustical panels. The flocculant is preferably used in the range of about 0.1% to about 3% by weight of the panel and more preferably from about 0.1% to about 2%. Useful flocculants include, but are not limited to, aluminum chlorohydrate, aluminum sulfate, calcium oxide, ferric chloride, ferrous sulfate, polyacrylamide, sodium aluminate and sodium silicate.

In one embodiment of making base mats for the acoustical panels, the aqueous slurry is preferably created by mixing water with the ground renewable component, mineral wool, expanded perlite, cellulosic fibers, starch, calcium carbonate, clay and flocculant. Mixing operations are preferably carried out in a stock chest, either in batch modes or in continuous modes. Other mixing methods known in the art would be acceptable as well. The amount of added water is such that the resultant total solid content or consistency is in the range of about 1% to about 8% consistency, preferably from about 2% to about 6% and more preferably from about 3% to about 5%.

Once a homogeneous slurry including the above-mentioned ingredients is formed, the slurry is transported to a headbox, which provides a steady flow of the slurry material. The slurry flowing out of the headbox is distributed onto a moving foraminous wire to form the wet base mat. Water is first drained from the wire by gravity. It is contemplated that in certain embodiments, a low vacuum pressure may be used in combination with, or after draining water from the slurry by gravity. Additional water is then optionally removed by pressing and/or using vacuum-assisted water removal, as would be appreciated by those having ordinary skill in the art. The remainder of the water is typically evaporated in an oven or kiln to form the formed base mat.

Once formed, the base mats preferably have a bulk density between about 7 to about 30 lbs/ft$^3$ (112 to 480 kg/m$^3$), more preferably between about 8 to about 25 lbs/ft$^3$ (128 to 400 kg/m$^3$) and most preferably from about 9 to about 20 lbs/ft$^3$ (144 to 320 kg/m$^3$).

The formed base mat is then cut and converted into the acoustical panel through finishing operations well known by those having ordinary skill in the art. Some of the preferred finishing operations include, among others, surface grinding, coating, perforating, fissuring, edge detailing and/or packaging.

Perforating and fissuring contribute significantly to improving acoustical absorption value from the above-described base mats. Perforating operations provide multiple perforations on the surface of a base mat at a controlled depth and density (number of perforations per unit area). Perforating is carried out by pressing a plate equipped with a predetermined number of needles onto a base mat. Fissuring provides indentation of unique shapes onto the surface of a formed base mat with, for example, a roll equipped with a patterned metal plate. Both perforating and fissuring steps open the base mat surface and its internal structure, thereby allowing air to move in and out of the panel. Openings in the base mat also allow sound to enter and be absorbed by the base mat core.

In addition, the acoustical panels are optionally laminated with a scrim or veil. It is also contemplated that the present acoustical panels can be manually cut with a utility knife.

Once formed, the present acoustical panels preferably have a bulk density between about 9 to about 32 lbs/ft$^3$ (144 to 513 kg/m$^3$), more preferably between about 10 to about 27 lbs/ft$^3$ (160 to 433 kg/m$^3$) and most preferably from about 11 to about 22 lbs/ft$^3$ (176 to 352 kg/m$^3$). In addition, the panels preferably have a thickness between about 0.2 inches to 1.5 inches (5 to 38 mm), more preferably between about 0.3 inches to 1.0 inch (8 to 25 mm) and most preferably from about 0.5 inches to about 0.75 inches (13 to 19 mm).

Acoustical panels including at least one renewable component preferably achieve an NRC value of at least about 0.25 and a CAC value of at least about 25. Moreover, the acoustical panels achieve an eNRC value of least about 0.15. In addition, the acoustical panels achieve an MOR value of at least about 80 psi and a hardness value of at least about 100 lbf, while achieving a maximum sag value in a 90% RH humidity chamber of 1.5 inch (38 mm). Still further, the acoustical panels achieve a flame spread index of less than about 25 and a smoke development index of less than about 50. The acoustical panels also have an STC of at least about 25.

EXAMPLE 1

Buckwheat hulls were obtained from Zafu Store, Houston, Tex. The buckwheat hull was further ground with a Fritz mill equipped with a 0.05" (1.27 mm) diameter perforated screen size. The buckwheat hulls were ground until all of the materials passed through the screen. The bulk density of the ground buckwheat hull was about 24.5 lbs/ft$^3$ (392 kg/m$^3$). The size distribution of the ground buckwheat hull was: 21.0% retained on the 20 mesh, 47.4% retained on the 30 mesh, 21.0% retained on the 40 mesh, and 5.6% retained on the 50 mesh, 2.8% retained on the 100 mesh, and 2.3% passed through 100 mesh.

A slurry having about 4.5% consistency was formed by mixing water with panel ingredients and varying amount of perlite and ground buckwheat hulls as described in Table 1. With water being constantly stirred, the ingredients were added in the following order: newsprint pulp, starch, calcium carbonate, ground buckwheat hull, mineral wool and expanded perlite. The slurry was agitated for about 2 minutes. At the end of agitation, about 0.1% by weight of flocculent was added to the slurry. The slurry was then poured into a forming box having the dimensions 14"×14"×30" (0.36 m×0.36 m×0.76 m).

At the bottom of the forming box, a fiberglass scrim supported by a metal grid allowed the slurry water to drain freely, while retaining most of the solids. Additional water was removed by applying a low pressure vacuum (1" Hg (25 mm)) to the forming box. The wet base mat was then pressed to remove additional water and also to consolidate the base mat structure. Finally, the wet base mat was further dewatered by applying a higher pressure vacuum (5-9" Hg (127 mmHg-229 mmHg)). The formed base mat was then dried in an oven or kiln at 315° C. (600° F.) for 30 minutes and 149° C. (300° F.) for 3 hours to remove the remaining moisture.

In Table 1, about 10% mineral wool by weight of the panel was used to form the panel, along with about 19% newsprint fibers by weight of the panel, about 8% starch by weight of the panel and about 6% calcium carbonate by weight by weight of the panel. The amount of perlite and ground buckwheat hulls are indicated below. Properties of the resultant dried base mats are also listed.

was then dried in an oven or kiln at 315° C. (600° F.) for 30 minutes and 149° C. (300° F.) for 3 hours to remove remaining moisture.

TABLE 1

| Test No. | Screen Opening, inches (mm) | Perlite, % by wt. | Ground Buckwheat Hull, % by wt. | Mat Thickness, inches (mm) | Density, lbs/ft³ (kg/m³) | MOR, psi | Hardness, lbf | eNRC (unperf.) | Airflow Resistivity, mPa·s/m² |
|---|---|---|---|---|---|---|---|---|---|
| 1 | — | 57.0 | 0 | 0.611 (15.5) | 13.16 (211) | 77 | 166 | 0.19 | 4.06 |
| 2 | 0.050" (1.3) | 37.0 | 20.0 | 0.602 (15.3) | 13.29 (213) | 97 | 128 | 0.35 | 0.62 |
| 3 | 0.050" (1.3) | 17.0 | 40.0 | 0.580 (14.7) | 13.61 (218) | 103 | 97 | 0.43 | 0.14 |

As shown, base mats containing buckwheat hulls are more acoustically absorbent, which is indicated by a higher eNRC value than the control (test #1).

EXAMPLE 2

Wood shavings, used as pine bedding, were obtained from American Wood Fiber Inc., Columbia, Md. The wood shavings were further ground with a Fritz mill equipped with a 0.050" (1.27 mm) diameter perforated screen size. The wood shavings were ground until all of the materials passed through the screen. The bulk density of the ground wood shavings was about 8.9 lbs/ft³ (143 kg/m³). The size distribution of the ground wood shavings was: 5.5 retained on 20 mesh, 37.6% retained on 30 mesh, 24.3% retained on 40 mesh, 13.6% retained on 50 mesh, 12.6% retained on 100 mesh, and 6.4% passed through 100 mesh.

A slurry having about 4.5% consistency was formed by mixing water with panel ingredients and varying amount of perlite and ground wood shavings as described in Table 2. With water being constantly stirred, the ingredients were added in the following order: newsprint pulp, starch, calcium carbonate, ground wood shavings, mineral wool and expanded perlite. The slurry was agitated for about 2 minutes. At the end of agitation, about 0.1% by weight of the slurry of flocculant was added to the slurry. The slurry was then poured into a forming box having the dimensions 14"×14"×30" (0.36 m×0.36 m×0.76 m).

At the bottom of the forming box, a fiberglass scrim supported by a metal grid allowed the slurry water to drain freely, while retaining most of the solids. Additional water was removed by applying a low pressure vacuum (1" Hg (25 mm)) to the forming box. The wet base mat was then pressed to a constant wet thickness to remove additional water and also to consolidate the base mat structure. Finally, the wet base mat was further dewatered by applying a higher pressure vacuum (5-9" Hg (127 mmHg-229 mmHg)). The formed base mat In Table 2, about 10% mineral wool by weight of the panel was used to form the panel, along with about 19% newsprint fibers by weight of the panel, about 8% starch by weight of the panel and about 6% calcium carbonate by weight of the panel. The amount of perlite and ground wood shavings are indicated below. Properties of the resultant dried base mats are also listed.

TABLE 2

| Test No. | Screen Opening, inches (mm) | Perlite, % by wt. | Ground Wood Shavings % by wt. | Mat Thickness, inches (mm) | Density, lbs/ft³ (kg/m³) | MOR, psi | Hardness, lbf | eNRC (unperf.) | Airflow Resistivity, mPa·s/m² |
|---|---|---|---|---|---|---|---|---|---|
| 4 | 0.050 (1.3) | 37.0 | 20.0 | 0.639 (16.2) | 12.59 (202) | 86 | 148 | 0.27 | 1.58 |
| 5 | 0.050 (1.3) | 17.0 | 40.0 | 0.611 (15.5) | 13.05 (209) | 137 | 151 | 0.32 | 0.84 |

As shown, base mats containing ground wood shavings, are more acoustically absorbent, which is indicated in a higher eNRC value than the control (test #1).

EXAMPLE 3

Wheat straw was obtained from Galusha Farm in Warrenville, Ill. The wheat straw was further ground with a Fritz mill equipped with a 0.050" (1.27 mm) diameter perforated screen size. The wheat straw was ground until most of the materials passed through the screen. The bulk density of the ground wheat straw was about 7.7 lbs/ft³ (123 kg/m³). The size distribution of ground wheat straw was: 3.6% retained on 20 mesh, 25.3% retained on 30 mesh, 25.4% retained on 40 mesh, 19.8% retained on 50 mesh, 17.1% retained on 100 mesh, and 8.9% passed through 100 mesh.

A slurry having about 4.5% consistency was formed by mixing water with panel ingredients and varying amount of perlite and ground wheat straw as described in Table 3. With water being constantly stirred, the ingredients were added in the following order: newsprint pulp, starch, calcium carbonate, ground wheat straw, mineral wool and expanded perlite. The slurry was agitated for about 2 minutes. At the end of agitation, about 0.1% by weight of the slurry of flocculant was added to the slurry. The slurry was then poured into a forming box having the dimensions 14"×14"×30" (0.36 m×0.36 m×0.76 m).

At the bottom of the forming box, a fiberglass scrim supported by a metal grid allowed the slurry water to drain freely, while retaining most of the solids. Additional water was removed by applying a low pressure vacuum (1" Hg (25 mm)) to the forming box. The wet base mat was then pressed to a constant wet thickness to remove additional water and also to consolidate the base mat structure. Finally, the wet base mat was further dewatered by applying a higher pressure vacuum (5-9" Hg (127 mmHg-229 mmHg). The formed base mat was then dried in an oven or kiln at 315° C. (600° F.) for 30 minutes and 149° C. (300° F.) for 3 hours to remove remaining moisture.

In Table 3, about 10% mineral wool by weight of the panel was used to form the panel, along with about 19% newsprint fibers by weight of the panel, about 8% starch by weight of the panel and about 6% calcium carbonate by weight of the panel. The amount of perlite and ground wheat straw are indicated below. Properties of the resultant dried base mats are also listed.

TABLE 3

| Test No. | Perlite, % by wt. | Ground Wheat Straw % by wt. | Mat Thickness, inches (mm) | Density, lbs/ft³ (kg/m³) | MOR, psi | Hardness, lbf | eNRC (unperf.) | Airflow Resistivity, mPa·s/m² |
|---|---|---|---|---|---|---|---|---|
| 6 | 37.0 | 20.0 | 0.617 (15.7) | 12.56 (201) | 121 | 159 | 0.26 | 2.02 |
| 7 | 17.0 | 40.0 | 0.635 (16.1) | 11.81 (189) | 114 | 114 | 0.35 | 0.80 |

As shown, base mats containing ground wheat straw, are more acoustically absorbent, which is indicated in a higher eNRC value than the control (test #1).

EXAMPLE 4

Sawdust was obtained from ZEP, Carterville, Ga., as a floor sweeping material. The bulk density of the sawdust was about 24.0 lbs/ft³ (384 kg/m³). The size distribution of the sawdust was: 9.0% retained on the 20 mesh, 24.3% retained on the 30 mesh, 22.7% retained on the 40 mesh, and 19.1% retained on the 50 mesh, 21.4% retained on the 100 mesh, and 3.6% passed through 100 mesh.

A slurry having about 4.5% consistency was formed by mixing water with panel ingredients and varying amount of perlite and sawdust as described in Table 4. With water being constantly stirred, the ingredients were added in the following order: newsprint pulp, starch, calcium carbonate, sawdust, mineral wool and expanded perlite. The slurry was agitated for about 2 minutes. At the end of agitation, about 0.1% by weight of flocculant was added to the slurry. The slurry was then poured into a forming box having the dimensions 14"×14"×30" (0.36 m×0.36 m×0.76 m).

At the bottom of the forming box, a fiberglass scrim supported by a metal grid allowed the slurry water to drain freely, while retaining most of the solids. Additional water was removed by applying a low pressure vacuum (1" Hg (25 mm)) to the forming box. The wet base mat was then pressed to remove additional water and also to consolidate the base mat structure. Finally, the wet base mat was further dewatered by applying a higher pressure vacuum (5-9" Hg (127 mmHg-229 mmHg)). The formed base mat was then dried in an oven or kiln at 315° C. (600° F.) for 30 minutes and 149° C. (300° F.) for 3 hours to remove the remaining moisture.

In Table 4, about 10% mineral wool by weight of the panel was used to form the panel, along with about 19% newsprint fibers by weight of the panel, about 8% starch by weight of the panel and about 6% calcium carbonate by weight by weight of the panel. The amount of perlite and sawdust are indicated below. Properties of the resultant dried base mats are also listed.

TABLE 4

| Test No. | Screen Opening, inches (mm) | Perlite, % by wt. | Sawdust, % by wt. | Mat Thickness, inches (mm) | Density, lbs/ft³ (kg/m³) | MOR, psi | Hardness, lbf | eNRC (unperf.) | Airflow Resistivity, mPa·s/m² |
|---|---|---|---|---|---|---|---|---|---|
| 8 | 0.050" (1.3) | 37.0 | 20.0 | 0.635 (16.1) | 11.81 (189) | 92 | 134 | 0.35 | 1.11 |
| 9 | 0.050" (1.3) | 17.0 | 40.0 | 0.551 (14.0) | 12.90 (206) | 112 | 109 | 0.46 | 0.15 |

As shown, base mats containing sawdust are more acoustically absorbent, which is indicated by a higher eNRC value than the control (test #1).

EXAMPLE 5

Ground corn cobs were obtained from Kramer Industries Inc., Piscataway, N.J. The bulk density of the ground corn cob was about 18.5 lbs/ft³ (296 kg/m³). The size distribution of the ground corn cobs was: 0.0% retained on the 20 mesh, 0.1% retained on the 30 mesh, 1.6% retained on the 40 mesh, and 94.1% retained on the 50 mesh, 4.1% retained on the 100 mesh, and 0.2% passed through 100 mesh.

A slurry having about 4.5% consistency was formed by mixing water with panel ingredients and varying amount of perlite and ground corn cobs as described in Table 5. With water being constantly stirred, the ingredients were added in the following order: newsprint pulp, starch, calcium carbonate, ground corn cobs, mineral wool and expanded perlite. The slurry was agitated for about 2 minutes. At the end of agitation, about 0.1% by weight of flocculant was added to the slurry. The slurry was then poured into a forming box having the dimensions 14"×14"×30" (0.36 m×0.36 m×0.76 m).

At the bottom of the forming box, a fiberglass scrim supported by a metal grid allowed the slurry water to drain freely, while retaining most of the solids. Additional water was removed by applying a low pressure vacuum (1" Hg (25 mm)) to the forming box. The wet base mat was then pressed to remove additional water and also to consolidate the base mat structure. Finally, the wet base mat was further dewatered by applying a higher pressure vacuum (5-9" Hg (127 mmHg-229 mmHg)). The formed base mat was then dried in an oven or kiln at 315° C. (600° F.) for 30 minutes and 149° C. (300° F.) for 3 hours to remove the remaining moisture.

In Table 5, about 10% mineral wool by weight of the panel was used to form the panel, along with about 19% newsprint fibers by weight of the panel, about 8% starch by weight of the panel and about 6% calcium carbonate by weight by weight of the panel. The amount of perlite and ground corn cobs are indicated below. Properties of the resultant dried base mats are also listed.

TABLE 5

| Test No. | Perlite, % by wt. | Ground Corn Cob, % by wt. | Mat Thickness, inches (mm) | Density, lbs/ft³ (kg/m³) | MOR, psi | Hardness, lbf | eNRC (unperf.) | Airflow Resistivity, mPa·s/m² |
|---|---|---|---|---|---|---|---|---|
| 10 | 17 | 40 | 0.642 (16.3) | 10.96 (176) | 92.1 | 112 | 0.47 | 0.40 |
| 11 | 0 | 57 | 0.584 (14.8) | 12.79 (205) | 112.1 | 135 | 0.57 | 0.16 |

As shown, base mats containing ground corn cobs are acoustically more absorbent, which is indicated by a higher eNRC value than the control (test #1).

EXAMPLE 6

Ground walnut shells were obtained from Kramer Industries Inc., Piscataway, N.J. The bulk density of the ground walnut shell was about 44.2 lbs/ft³ (708 kg/m³). The size distribution of the ground walnut shell was: 0.0% retained on the 20 mesh, 0.0% retained on the 30 mesh, 3.9% retained on the 40 mesh, and 72.5% retained on the 50 mesh, 23.2% retained on the 100 mesh, and 0.3% passed through 100 mesh.

A slurry having about 4.5% consistency was formed by mixing water with panel ingredients and varying amount of perlite and ground walnut shell as described in Table 6. With water being constantly stirred, the ingredients were added in the following order: newsprint pulp, starch, calcium carbonate, ground walnut shells, mineral wool and expanded perlite. The slurry was agitated for about 2 minutes. At the end of agitation, about 0.1% by weight of flocculant was added to the slurry. The slurry was then poured into a forming box having the dimensions 14"×14"×30" (0.36 m×0.36 m×0.76 m).

At the bottom of the forming box, a fiberglass scrim supported by a metal grid allowed the slurry water to drain freely, while retaining most of the solids. Additional water was removed by applying a low pressure vacuum (1" Hg (25 mm)) to the forming box. The wet base mat was then pressed to remove additional water and also to consolidate the base mat structure. Finally, the wet base mat was further dewatered by applying a higher pressure vacuum (5-9" Hg (127 mmHg-229 mmHg)). The formed base mat was then dried in an oven or kiln at 315° C. (600° F.) for 30 minutes and 149° C. (300° F.) for 3 hours to remove the remaining moisture.

In Table 6, about 10% mineral wool by weight of the panel was used to form the panel, along with about 19% newsprint fibers by weight of the panel, about 8% starch by weight of the panel and about 6% calcium carbonate by weight by weight of the panel. The amount of perlite and ground walnut shells are indicated below. Properties of the resultant dried base mats are also listed.

TABLE 6

| Test No. | Perlite, % by wt. | Ground Walnut Shell, % by wt. | Mat Thickness, inches (mm) | Density, lbs/ft³ (kg/m³) | MOR, psi | Hardness, lbf | eNRC (unperf.) | Airflow Resistivity, mPa·s/m² |
|---|---|---|---|---|---|---|---|---|
| 12 | 0 | 57 | 0.417 (10.6) | 19.19 (307) | 217.4 | 215.7 | 0.42 | 0.47 |

As shown, base mats containing ground walnut shells are acoustically more absorbent, which is indicated by a higher eNRC value than the control (test #1).

EXAMPLE 7

Peanut shells were obtained from a local grocery store. The peanut shells were further ground with a Fritz mill equipped with a 0.05" (1.27 mm) diameter perforated screen size. The peanut shells were ground until all of the materials passed through the screen. The bulk density of the ground peanut shells was 15.2 lbs/ft³ (243 kg/m³). The size distribution of the ground peanut shells was: 0.2% retained on the 20 mesh, 13.1% retained on the 30 mesh, 31.5% retained on the 40 mesh, and 19.8% retained on the 50 mesh, 29.2% retained on the 100 mesh, and 6.1% passed through 100 mesh.

A slurry having about 4.5% consistency was formed by mixing water with panel ingredients and varying amount of perlite and ground peanut shells as described in Table 7. With water being constantly stirred, the ingredients were added in the following order: newsprint pulp, starch, calcium carbonate, ground peanut shells, mineral wool and expanded perlite. The slurry was agitated for about 2 minutes. At the end of agitation, about 0.1% by weight of flocculant was added to the slurry. The slurry was then poured into a forming box having the dimensions 14"×14"×30" (0.36 m×0.36 m×0.76 m).

At the bottom of the forming box, a fiberglass scrim supported by a metal grid allowed the slurry water to drain freely, while retaining most of the solids. Additional water was removed by applying a low pressure vacuum (1" Hg (25 mm)) to the forming box. The wet base mat was then pressed to remove additional water and also to consolidate the base mat structure. Finally, the wet base mat was further dewatered by applying a higher pressure vacuum (5-9" Hg (127 mmHg-229 mmHg)). The formed base mat was then dried in an oven or kiln at 315° C. (600° F.) for 30 minutes and 149° C. (300° F.) for 3 hours to remove the remaining moisture.

In Table 7, about 10% mineral wool by weight of the panel was used to form the panel, along with about 19% newsprint fibers by weight of the panel, about 8% starch by weight of the panel and about 6% calcium carbonate by weight by weight of the panel. The amount of perlite and ground peanut shells are indicated below. Properties of the resultant dried base mats are also listed.

distribution of the ground sunflower seed hulls was: 0.1% retained on the 20 mesh, 8.9% retained on the 30 mesh, 30.3% retained on the 40 mesh, and 29.3% retained on the 50 mesh, 23.9% retained on the 100 mesh, and 7.5% passed through 100 mesh.

A slurry having about 4.5% consistency was formed by mixing water with panel ingredients and varying amount of perlite and ground sunflower seed hulls as described in Table 8. With water being constantly stirred, the ingredients were added in the following order: newsprint pulp, starch, calcium carbonate, ground sunflower seed hulls, mineral wool and expanded perlite. The slurry was agitated for about 2 minutes. At the end of agitation, about 0.1% by weight of flocculant was added to the slurry. The slurry was then poured into a forming box having the dimensions 14"×14"×30" (0.36 m×0.36 m×0.76 m).

At the bottom of the forming box, a fiberglass scrim supported by a metal grid allowed the slurry water to drain freely, while retaining most of the solids. Additional water was removed by applying a low pressure vacuum (1" Hg (25 mm)) to the forming box. The wet base mat was then pressed to remove additional water and also to consolidate the base mat structure. Finally, the wet base mat was further dewatered by applying a higher pressure vacuum (5-9" Hg (127 mmHg-229 mmHg)). The formed base mat was then dried in an oven or

TABLE 7

| Test No. | Perlite, % by wt. | Ground Peanut shells, % by wt. | Mat Thickness, inches (mm) | Density, lbs/ft³ (kg/m³) | MOR, psi | Hardness, lbf | eNRC (unperf.) | Airflow Resistivity, mPa · s/m² |
|---|---|---|---|---|---|---|---|---|
| 13 | 0 | 57 | 0.423 (10.7) | 18.0 (288) | 240.7 | 184 | 0.32 | 2.09 |

As shown, base mats containing ground peanut shells are acoustically more absorbent, which is indicated by a higher eNRC value than the control (test #1).

EXAMPLE 8

Ground sunflower seed hulls were obtained from Archer Deniels Midland, N.D. The bulk density of the ground sunflower seed hulls was about 12.4 lbs/ft³ (199 kg/m³). The size kiln at 315° C. (600° F.) for 30 minutes and 149° C. (300° F.) for 3 hours to remove the remaining moisture.

In Table 8, about 10% mineral wool by weight of the panel was used to form the panel, along with about 19% newsprint fibers by weight of the panel, about 8% starch by weight of the panel and about 6% calcium carbonate by weight by weight of the panel. The amount of perlite and ground sunflower seed hulls are indicated below. Properties of the resultant dried base mats are also listed.

TABLE 8

| Test No. | Perlite, % by wt. | Ground Sunflower seed hulls, % by wt. | Mat Thickness, inches (mm) | Density, lbs/ft³ (kg/m³) | MOR, psi | Hardness, lbf | eNRC (unperf.) | Airflow Resistivity, mPa · s/m² |
|---|---|---|---|---|---|---|---|---|
| 14 | 37 | 20 | 0.627 (15.9) | 12.01 (192) | 92.9 | 127.3 | 0.24 | 2.22 |
| 15 | 17 | 40 | 0.590 (15.0) | 13.59 (218) | 106.5 | 121.8 | 0.42 | 0.53 |
| 16 | 0 | 57 | 0.542 (13.8) | 14.32 (229) | 118.7 | 119 | 0.52 | 0.39 |

As shown, base mats containing ground sunflower seed hulls are acoustically more absorbent, which is indicated by a higher eNRC value than the control (test #1).

While particular embodiments of panels for use as building materials that include a renewable component have been shown and described, it will be appreciated by those skilled in the art that changes and modifications may be made thereto without departing from the invention in its broader aspects and as set forth in the following claims.

What is claimed is:

1. An acoustical panel having a panel core comprising:
   from about 0.1% to about 95% by weight of a ground renewable component having a particle size distribution wherein less than 5% of ground renewable component particles are retained by a first mesh screen having openings of about 0.312 inches and less than 5% of the particles pass through a second mesh screen having openings of about 0.059 inches;
   from about 0.1% to about 95% by weight of one or more fibers; and
   from about 1% to about 30% by weight of one or more binders, all weights based on dry panel weight
   wherein said panel has at least one of a Ceiling Attenuation Class value of at least about 25 and a Sound Transmission Class of at least about 25.

2. The acoustical panel of claim 1 wherein said ground renewable component comprises rice hulls, buckwheat hulls, nut shells, including peanut and walnut shells, wheat chaff, oat husks, rye whisks, cotton seed hulls, coconut shells, corn bran, corn cobs, sunflower seeds, rice straw stalk, wheat straw stalk, barley straw stalk, oat straw stalk, rye straw stalk, Espart, sorghum stalks, reeds, bamboos, sisal, Sabai, ramie, bagasse, flax, kenaf, jute, hemp, abaca, saw dust, wood chips or combinations thereof.

3. An acoustical panel having a panel core comprising:
   from about 0.1% to about 95% by weight of a ground renewable component having a particle size distribution wherein less than 5% of ground renewable component particles are retained by a first mesh screen with openings of about 0.132 inches;
   from about 0.1% to about 95% by weight of one or more fibers; and
   from about 1% to about 30% by weight of one or more binders, all weights based on dry panel weight,
   wherein said panel has at least one of a Ceiling Attenuation Class value of at least about 25 and a Sound Transmission Class of at least about 25.

4. The acoustical panel of claim 3 wherein said ground renewable component comprises rice hulls, buckwheat hulls, nut shells, including peanut and walnut shells, wheat chaff, oat husks, rye whisks, cotton seed hulls, coconut shells, corn bran, corn cobs, sunflower seeds, rice straw stalk, wheat straw stalk, barley straw stalk, oat straw stalk, rye straw stalk, Espart, sorghum stalks, reeds, bamboos, sisal, Sabai, ramie, bagasse, flax, kenaf, jute, hemp, abaca, saw dust, wood chips or combinations thereof.

5. The acoustical panel of claim 1, 2, 3 or 4 wherein said ground renewable component is present in amount of about 7% to about 40% by weight based on the dry panel weight.

6. The acoustical panel of claim 1, 2, 3 or 4 wherein said one or more fibers is selected from the group consisting of recycled paper fibers, mineral wool, glass wool, rock wool and combinations thereof.

7. A panel for use as a building material, wherein said panel is formed from an aqueous slurry including an inorganic fiber component, starch, water and a renewable component, about 0.1% to about 95% by weight of the panel, after removal of the water, being of the renewable component, wherein said panel has at least one of a Ceiling Attenuation Class value of at least about 25 and a Sound Transmission Class value of at least about 25.

8. The panel of claim 7, wherein said renewable component comprises rice hulls, buckwheat hulls, nut shells, including peanut and walnut shells, wheat chaff, oat husks, rye whisks, cotton seed hulls, coconut shells, corn bran, corn cobs, sunflower seeds, rice straw stalk, wheat straw stalk, barley straw stalk, oat straw stalk, rye straw stalk, Espart, sorghum stalks, reeds, bamboos, sisal, Sabai, ramie, bagasse, flax, kenaf, jute, hemp, abaca, saw dust, wood chips or combinations thereof.

9. The panel of claim 7 having an estimated Noise Reduction Coefficient value of at least about 0.20.

10. The panel of claim 7 having an air flow resistivity of less than about 8 mPa·s/m$^2$.

11. The panel of claim 7 having a Modulus of Rupture value of at least about 80 psi.

12. The panel of claim 7 having a bulk density between about 7 lbs/ft$^3$ and about 30 lbs/ft$^3$.

13. The panel of claim 7 having a thickness of between about 0.2 inches and about 1.5 inches.

14. The panel of claim 7 that sags less than about 1.5 inches in a 90% RH humidity chamber.

15. The panel of claim 7 having a flame spread index of less than about 50.

16. The panel of claim 7 having a smoke development index of less than about 50.

17. The panel of claim 7 wherein a bulk density of said renewable component is between 5 and 50 lbs/ft$^3$.

18. A panel for use as a building material, wherein said panel is formed from an aqueous slurry including an inorganic fiber component, starch, water and a renewable component, about 0.1% to about 95% by weight of the panel, after removal of the water, being of the renewable component, the renewable component being reduced in size such that no more than 5% by weight of the renewable component is retained by a mesh screen with openings of about 0.312 inches, wherein said panel has at least one of a Ceiling Attenuation Class value of at least about 25 and a Sound Transmission Class value of at least about 25.

* * * * *